United States Patent
Wu (10) Patent No.: US 10,621,391 B2
(45) Date of Patent: Apr. 14, 2020

(54) METHOD AND APPARATUS FOR ACQUIRING SEMANTIC FRAGMENT OF QUERY BASED ON ARTIFICIAL INTELLIGENCE

(71) Applicant: BEIJING BAIDU NETCOM SCIENCE AND TECHNOLOGY CO., LTD., Beijing (CN)

(72) Inventor: Yufang Wu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 178 days.

(21) Appl. No.: 15/854,064

(22) Filed: Dec. 26, 2017

(65) Prior Publication Data

US 2018/0365225 A1    Dec. 20, 2018

(30) Foreign Application Priority Data

Jun. 19, 2017 (CN) .......................... 2017 1 0466186

(51) Int. Cl.
| | |
|---|---|
| *G06F 17/27* | (2006.01) |
| *G06F 40/30* | (2020.01) |
| *G06N 20/00* | (2019.01) |
| *G06F 16/242* | (2019.01) |
| *G06F 16/2452* | (2019.01) |
| *G06N 5/02* | (2006.01) |

(52) U.S. Cl.
CPC .......... *G06F 40/30* (2020.01); *G06F 16/2425* (2019.01); *G06F 16/24522* (2019.01); *G06N 5/022* (2013.01); *G06N 20/00* (2019.01)

(58) Field of Classification Search
CPC ............ G06F 17/2785; G06F 16/2425; G06F 16/24522; G06N 20/00; G06N 5/022
See application file for complete search history.

(56) References Cited

U.S. PATENT DOCUMENTS

| | | | |
|---|---|---|---|
| 6,173,261 B1* | 1/2001 | Arai ...................... | G06F 17/274 704/231 |
| 2016/0055147 A1* | 2/2016 | Duan ................... | G06F 17/2785 704/9 |
| 2017/0103059 A1* | 4/2017 | Cai ........................ | G06F 17/277 |
| 2018/0081861 A1* | 3/2018 | Danielyan ........... | G06F 17/2785 |

* cited by examiner

*Primary Examiner* — Nafiz E Hoque
(74) *Attorney, Agent, or Firm* — Hodgson Russ LLP (57) ABSTRACT

Provided are a method and an apparatus for acquiring a semantic fragment of a query based on artificial intelligence, and a terminal. The method includes pre-processing the query and determining a first main word and a semantic fragment set included in the query; determining an association degree between each semantic fragment in the semantic fragment set and the first main word according to historical retrieve data; filtering the semantic fragment set according to the association degree and determining an object semantic fragment set corresponding to the query.

17 Claims, 2 Drawing Sheets

METHOD AND APPARATUS FOR ACQUIRING SEMANTIC FRAGMENT OF QUERY BASED ON ARTIFICIAL INTELLIGENCE

CROSS-REFERENCE TO RELATED APPLICATION

This application claims priority to and benefits of Chinese Patent Application Serial No. 201710466186.3, filed with the State Intellectual Property Office of P. R. China on Jun. 19, 2017, the entire content of which is incorporated herein by reference.

FIELD

The present disclosure relates to the field of computer technology, and more particularly to a method and apparatus for acquiring a semantic fragment of a query based on artificial intelligence.

BACKGROUND

Artificial Intelligence (AI) is a new technological science that studies and develops theories, methods, techniques and application systems for simulating, extending and expanding human intelligence. AI is also a branch of computer science, seeking to understand the essence of intelligence and to produce a new type of intelligent machine that responds in a manner similar to human intelligence. Researches of AI may include robotics, speech recognition, image recognition, natural language processing and expert systems.

In the semantic understanding technology, semantic information of a query is usually expressed in a structured form of intentions and slots. Specifically, the slot refers to some semantic fragments and the intention refers to a demand word i.e., a main word of the query. For example, if a query is "find a funny English movie without paying", "movie" is referred to a demand word to express the intention, that is, "movie" is the main word of the query. Semantic fragments such as "without paying", "funny" and "English" are used to limit the main word "movie".

Segmentation boundaries of the semantic fragments directly affect the slot recognition results, which indirectly affects satisfaction of a user on the query results. If a segmentation size of the semantic fragment is too small, different meanings may be resulted. For example, if "without paying" is separated into "without" and "paying", the slot may be likely to be identified as "paying", resulting in an opposite result.

If the segmentation size of the semantic fragment is too large, a slot dimension may not be matched with a resource dimension, and thus no result meeting the conditions of the query can be retrieved. For example, if "funny English" is not separated and directly used to carry out a retrieve, it is likely that no result meeting conditions of such semantic fragment is obtained, as "funny" and "English" belong to two dimensions in the knowledge base resources. Therefore, it is of great importance to extract the semantic fragments with ideal segmentation boundary.

In the related art, semantic fragment of the query is usually mined with a manually edited template. However, such method needs accumulation edited manually, which wastes human resources, and is not conducive to automation. In addition, because the template is not flexible enough, only the fragment in a fixed format can be identified, thus leading to poor effect of the semantic fragment recognition. Therefore, the results retrieved for the query cannot meet the requirements of the users.

SUMMARY

Embodiments of the present disclosure provide a method for acquiring a semantic fragment of a query based on artificial intelligence, including: pre-processing the query and determining a first main word and a semantic fragment set included in the query; determining an association degree between each semantic fragment in the semantic fragment set and the first main word according to historical retrieve data; filtering the semantic fragment set according to the association degree and determining an object semantic fragment set corresponding to the query.

Embodiments of the present disclosure provide an apparatus for acquiring a semantic fragment of a query based on artificial intelligence, including: one or more processors; a memory; one or more software modules stored in the memory and executable by the one or more processors, and including: a first determining module configured to pre-process the query and determine a first main word and a semantic fragment set included in the query; a second determining module configured to determine an association degree between each semantic fragment in the semantic fragment set and the first main word according to historical retrieve data; a third determining module configured to filter the semantic fragment set according to the association degree and determine an object semantic fragment set corresponding to the query.

Embodiments of the present disclosure provide a computer-readable storage medium, having stored therein computer programs that, when executed by a processor of a mobile terminal, causes the mobile terminal to perform the method for acquiring a semantic fragment of a query based on artificial intelligence, the method comprising: pre-processing the query and determining a first main word and a semantic fragment set included in the query; determining an association degree between each semantic fragment in the semantic fragment set and the first main word according to historical retrieve data; filtering the semantic fragment set according to the association degree and determining an object semantic fragment set corresponding to the query.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the related art, semantic fragment of the query is usually mined with a manually edited template. However, such method needs accumulation edited manually, which wastes human resources, and is not conducive to automation. In addition, because the template is not flexible enough, only fragments in a fixed format can be identified, thus leading to poor effect of the semantic fragment recognition. Therefore, the results retrieved for the query cannot meet the requirements of the users. In order to solve problems described above, embodiments of the present disclosure provide a method for acquiring a semantic fragment of a query based on artificial intelligence.

In embodiments of a first aspect of the present disclosure, a method for acquiring a semantic fragment of a query based on artificial intelligence is provided, including:

pre-processing the query and determining a first main word and a semantic fragment set included in the query;

determining an association degree between each semantic fragment in the semantic fragment set and the first main word according to historical retrieve data;

filtering the semantic fragment set according to the association degree and determining an object semantic fragment set corresponding to the query.

With the method for acquiring a semantic fragment of a query based on artificial intelligence according to embodiments of the present disclosure, the query is pre-processed and the first main word and the semantic fragment set included in the query are determined firstly, the association degree between each semantic fragment in the semantic fragment set and the first main word is determined according to historical retrieve data secondly; and the semantic fragment set is filtered according to the association degree to determine the object semantic fragment set corresponding to the query finally. Therefore, the object semantic fragment set corresponding to the query is acquired without the manually edited extraction template, which saves human resources and is conducive to automation. Moreover, the semantic fragment may be acquired in a flexible manner, such manner is self-adapt for mining semantic fragments with different segmentation sizes, which improves effect of semantic fragment recognition, and thus the requirements of the users may be better met by the retrieved result of the query and experience of the user may be improved.

In an embodiment of the present disclosure, determining a first main word and a semantic fragment set included in the query includes:

performing a word segmentation on the query and determining a word segment set included in the query;

determining the first main word in the word segment set according to a preset main word list.

In an embodiment of the present disclosure, determining the first main word in the word segment set includes:

determining whether a first word segment at the end of the query is in a preset noun list or a preset proper noun entity word list;

if yes, determining the first word segment is the first main word;

if no, determining whether a second word segment at the start of the query is in the preset noun list or the preset proper noun entity word list, determining that the second word segment is the first main word if the second word segment is in the preset noun list or the preset proper noun entity word list.

In an embodiment of the present disclosure, determining an association degree between each semantic fragment in the semantic fragment set and the first main word according to historical retrieve data includes:

performing data training on the historical retrieve data, and determining a table of association degrees between semantic fragments and main words in the historical retrieve data;

determining the association degree between each semantic fragment in the semantic fragment set and the first main word by searching the table of the association degrees.

In an embodiment of the present disclosure, before performing data training on the historical retrieve data, the method further includes:

acquiring the historical retrieve data;

cleaning the historical retrieve data according to at least one of a retrieval frequency, a satisfaction degree or a click rate, in which performing data training on the historical retrieve data includes:

performing the data training on the cleaned historical retrieve data.

In an embodiment of the present disclosure, after determining an object semantic fragment set corresponding to the query, the method further includes:

determining the number of main words retrieved in combination with each object semantic fragment in the object semantic fragment set according to the historical retrieve data;

determining a confidence of each object semantic fragment according to the number of the main words retrieved in combination with each object semantic fragment;

updating the object semantic fragment set according to the confidence of each object semantic fragment.

In an embodiment of the present disclosure, after determining a confidence of each object semantic fragment, the method further includes:

acquiring a retrieval result according to each object semantic fragment;

determining a display order of the retrieval results according to the confidence of each object semantic fragment.

With the method for acquiring a semantic fragment of a query based on artificial intelligence according to embodiments of the present disclosure, by determining the object semantic fragment set corresponding to the query according to the association degree between the first main word included in the query and each semantic fragment in the semantic fragment set, the object semantic fragment set corresponding to the query is acquired without the manually edited extraction template, which saves human resources and is conducive to automation. Moreover, the semantic fragment may be acquired in a flexible manner, such manner is self-adapt for mining semantic fragments with different segmentation sizes, which improves effect of semantic fragment recognition, and thus the requirements of the users may be better met by the retrieved result of the query and experience of the user may be improved.

In embodiments of a second aspect of the present disclosure, an apparatus for acquiring a semantic fragment of a query based on artificial intelligence is provided, including:

one or more processors;

a memory;

one or more software modules stored in the memory and executable by the one or more processors, and including:

a first determining module configured to pre-process the query and determine a first main word and a semantic fragment set included in the query;

a second determining module configured to determine an association degree between each semantic fragment in the semantic fragment set and the first main word according to historical retrieve data;

a third determining module configured to filter the semantic fragment set according to the association degree and determine an object semantic fragment set corresponding to the query.

With the apparatus for acquiring a semantic fragment of a query based on artificial intelligence according to embodiments of the present disclosure, the query is pre-processed and the first main word and the semantic fragment set included in the query are determined firstly, the association degree between each semantic fragment in the semantic fragment set and the first main word is determined according to historical retrieve data secondly; and the semantic fragment set is filtered according to the association degree to determine the object semantic fragment set corresponding to the query finally. Therefore, the object semantic fragment set corresponding to the query is acquired without the manually edited extraction template, which saves human resources and is conducive to automation. Moreover, the semantic fragment may be acquired in a flexible manner, such manner is self-adapt for mining semantic fragments with different segmentation sizes, which improves effect of semantic fragment recognition, and thus the requirements of the users may be better met by the retrieved result of the query and experience of the user may be improved.

In an embodiment of the present disclosure, the first determining module includes: a first determining unit configured to perform a word segmentation on the query and determine a word segment set included in the query;

a second determining unit configured to determine the first main word in the word segment set according to a preset main word list.

In an embodiment of the present disclosure, the second determining module is specifically configured to:

determine whether a first word segment at the end of the query is in a preset noun list or a preset proper noun entity word list;

if yes, determine the first word segment is the first main word;

if no, determine whether a second word segment at the start of the query is in the preset noun list or the preset proper noun entity word list, determine that the second word segment is the first main word if the second word segment is in the preset noun list or the preset proper noun entity word list.

In an embodiment of the present disclosure, the second determining module includes:

a third determining unit configured to perform data training on the historical retrieve data and determine a table of association degrees between semantic fragments and main words in the historical retrieve data;

a fourth determining unit configured to determine the association degree between each semantic fragment in the semantic fragment set and the first main word by searching the table of the association degrees.

In an embodiment of the present disclosure, the second determining module further includes:

an acquiring unit configured to acquire the historical retrieve data;

a processing unit configured to clean the historical retrieve data according to at least one of a retrieval frequency, a satisfaction degree or a click rate, in which the third determining unit is specifically configured to:

perform the data training on the cleaned historical retrieve data.

In an embodiment of the present disclosure, the apparatus further includes:

a fourth determining module configured to determine the number of main words retrieved in combination with each object semantic fragment in the object semantic fragment set according to the historical retrieve data;

a fifth determining module configured to determine a confidence of each object semantic fragment according to the number of the main words retrieved in combination with each object semantic fragment;

a processing module configured to update the object semantic fragment set according to the confidence of each object semantic fragment.

In an embodiment of the present disclosure, the apparatus further includes:

an acquiring module configured to acquire a retrieval result according to each object semantic fragment;

a sixth determining module configured to determine a display order of the retrieval results according to the confidence of each object semantic fragment.

In embodiments of a third aspect of the present disclosure, a computer-readable storage medium is provided, having stored therein computer programs that, when executed by a processor of a mobile terminal, causes the mobile terminal to perform a method for acquiring a semantic fragment of a query based on artificial intelligence, the method includes:

pre-processing the query and determining a first main word and a semantic fragment set included in the query;

determining an association degree between each semantic fragment in the semantic fragment set and the first main word according to historical retrieve data;

filtering the semantic fragment set according to the association degree and determining an object semantic fragment set corresponding to the query.

The method and apparatus for acquiring a semantic fragment of a query based on artificial intelligence are described below with reference to the drawings of the present disclosure.

Figure 1:
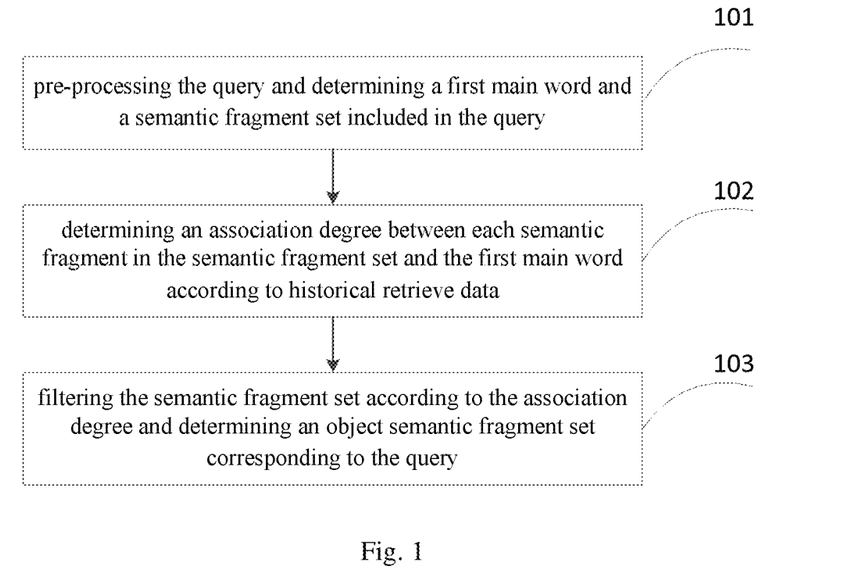
FIG. 1 is a flow chart of a method for acquiring a semantic fragment of a query based on artificial intelligence according to an embodiment of the present disclosure.

FIG. 1 is a flow chart of a method for acquiring a semantic fragment of a query based on artificial intelligence according to an embodiment of the present disclosure.

As shown in FIG. 1, the method for acquiring a semantic fragment of a query based on artificial intelligence includes the followings.

At block 101, the query is pre-processed and a first main word and a semantic fragment set included in the query are determined.

Specifically, an executive body configured to perform the method for acquiring a semantic fragment of a query based on artificial intelligence provided in embodiments of the present disclosure is an apparatus for acquiring a semantic fragment of a query based on artificial intelligence according to embodiments of the present disclosure. Such an apparatus may be configured in any terminal to acquire the object semantic fragment set corresponding to the query.

Specifically, block 101 may include blocks 101 and 101b.

At block 101a, a word segmentation is performed on the query and a word segment set included in the query is determined.

Specifically, after the query is acquired, the query may be subjected to the word segmentation according to methods such as a hash table or a trie algorithm, so as to determine the word segment set included in the query.

At block 101b, the first main word in the word segment set is determined according to a preset main word list.

Specifically, a noun resource may be mined from the historical retrieve data in advance, the mined nouns are filtered according to frequencies thereof, and nouns with high frequency may be constructed to be the preset main word list, such that the first main word in the word segment set may be determined according to the preset main word list.

It should be understood that, the main word of a query is usually a common noun such as "movie" or "song", or a proper noun entity word such as a name of a restaurant or of a movie. Therefore, in embodiments of the present disclosure, the main word list may include a common noun word list and a proper noun entity word list.

Specifically, block 101b may include:

determining whether a first word segment at the end of the query is in a preset noun list or a preset proper noun entity word list;

if yes, determining the first word segment is the first main word;

if no, determining whether a second word segment at the start of the query is in the preset noun list or the preset proper noun entity word list, determining that the second word segment is the first main word if the second word segment is in the preset noun list or the preset proper noun entity word list.

It would be understood that, a common noun or a proper noun entity word usually occurs at the end or the start of a query. For example, in query q1="restaurant suitable for classmates to have dinner together", "restaurant" at the start of the query q1 is a common noun, and "suitable for classmates to have dinner together" is used to defined the common noun "restaurant". For another example, in query q2="release date of san sheng san shi shi ii tao hua", "san sheng san shi shi ii tao hua" at the end of the query q2 is a proper noun entity word, and "release date" is used to describe a time-dimension attribute of the proper noun entity word "san sheng san shi shi li tao hua".

It would be appreciated that, the above examples are just used to illustrate the present disclosure, and shall not be construed to limit the present disclosure. Those skilled in the art can make modifications as required according to the expression habits of various languages.

Therefore, in embodiments of the present disclosure, the first main word included in the word segment set may be determined by searching the word segments at the start and the end of the query, respectively.

Specifically, it may be first determined whether the first word segment at the end of the query is in the preset noun list or the preset proper noun entity word list. If yes, the first word segment is determined as the first main word. If the first word segment at the end of the query is not in the preset noun list or the preset proper noun entity word list, then it is determined that whether a second word segment at the start of the query is in the preset noun list or the preset proper noun entity word list. If the second word segment is in the preset noun list or the preset proper noun entity word list, the second word segment is determined as the first main word.

For example, it is assumed that a noun list includes terms such as "restaurant" "movie", "television show", "song" and "novel", a proper noun entity word list includes terms such as "san sheng san shi shi ii tao hua", "KFC" and "Starbucks". For a query="find a funny English movie", since word segment "movie" at the end of the query is in the preset noun list, "movie" is determined to be the first main word. For the query "release date of san sheng san shi shi ii tao hua", since "san sheng san shi shi ii tao hua" at the end of the query is included in the present proper noun entity word list, "san sheng san shi shi ii tao hua" is determined to be the first main word. For yet another example, in the query="restaurant suitable for classmates to have dinner together", since "dinner" at the end of the query is not included in the preset noun list, while "restaurant" at the start of the query is included in the preset noun list, "restaurant" is determined to be the first main word.

It should be noted that, after the query is subjected to the word segmentation, first word segments with different segmentation sizes may be obtained at the start of the query or second word segments with different segmentation sizes may be obtained at the end of the query, and all the word segments with different segmentation sizes may be included in the preset main word list, in such a case, in an embodiment of the present disclosure, a word segment with the longest segmentation size is selected to be the first main word.

For example, after the word segmentation is performed on the query, the word segment obtained at the start of the query may be 'san sheng san shi' or 'sari sheng san shi shi li tao hua', and both of which are in the proper noun entity word list, in such a case, 'san sheng san shi shi li tao hua' is determined to be the first main word.

It should be understood that, when the first main word included in the word segment set is determined by searching the word segments at the start and the end of the query, a judging order of the first word segment at the end of the query and the second word segment at the start of the query may be predetermined or determined according actual needs, which is not limited herein.

For example, it is possible to preset that whether the first word segment at the end of the query is in the preset noun list or the preset proper noun entity word list is firstly determined, and then whether the second word segment at the start of the query is in the preset noun list or the preset proper noun entity word list is determined.

Alternatively, if it can be known from the historical retrieve data that in a preset time period, a possibility that a main word is at the start of the query is about 80%, it may be firstly determined whether the second word segment at the start of the query is in the preset noun list or the preset proper noun entity word list, If yes, the second word segment is determined as the first main word; If no, it is determined that whether the first word segment at the end of the query is in the preset noun list or the preset proper noun entity word list, and the first word segment may be determined as the first main word if the first word segment at the end of the query is in the preset noun list or the preset proper noun entity word list.

In addition, if it is known from the historical retrieve data that the position of the main word in the query is changed, the judging order of the first and second word segments may be adjusted according to the historical retrieve data.

Specifically, after the first main word included in the query is determined, semantic fragments in the semantic fragment set may be determined.

In an embodiment of the present disclosure, a text fragment constituted by word segments adjacent to each other in the query may be combined with the first main word to form a sub-query. The sub-query is searched in a pre-established query database, and if the sub-query is in the query database, the text fragment is determined to be the semantic fragment.

For example, if query q1 is "find a funny English movie without paying", a word segment set included in the query includes word segments "find", "funny", "English", "movie", "without" and "paying", in which "movie" is the first main word. sub-queries formed by combining the first main word "movie" and individual text fragments each constituted by word segments adjacent to each other in the query q1 include for example "find movie", "funny movie", "English movie" "funny English movie", "paying movie", "without paying movie", and "without movie", where "find movie", "funny movie", "English movie", "funny English movie", "paying movie" and "without paying movie" may be searched in the query database, but "without movie" cannot be searched in the query database. Therefore, it can be determined that the semantic fragment set included in the query q1 may include semantic fragments such as "find", "funny", "English", "funny English", "paying" and "without paying".

At block 102, an association degree between each semantic fragment in the semantic fragment set and the first main word is determined according to historical retrieve data.

Specifically, the association degree refers to a closeness degree of a relationship between the semantic fragment and the first main word, which may be determined according to at least one of a retrieval frequency, a satisfaction degree and a click rate of a sub-query formed by the semantic fragments and the first main word.

It should be understood that, the association degree may be directly characterised by the retrieval frequency, the satisfaction degree or the click rate. For example, an association degree between a certain semantic fragment and the first main word may be a retrieval frequency of 1000.

Alternatively, the association degree may be characterised by a value or a level comprehensively determined according to the retrieval frequency, the satisfaction degree and the click rate. For example, it may be preset that, in such a case that the retrieval frequency is smaller than 1000, the satisfaction degree is lower than 10% and the click rate is less than 1000, the association degree is at level one; and in such a case that the retrieval frequency is in a range of 1000 to 2000, the satisfaction degree is in a range of 10% to 20% and the click rate is in a range of 1000 to 2000, the association degree is at level two.

Specifically, block 102 may include the following blocks.

At block 102a, data training is performed on the historical retrieve data, and a table of association degrees between semantic fragments and main words in the historical retrieve data are determined.

At block 102b, the association degree between each semantic fragment in the semantic fragment set and the first main word is determined by searching the table of the association degrees.

In a specific implementation, by training the historical retrieve data, at least one of the retrieval frequency, the satisfaction degree or the click rate of a combination of the semantic fragment and the main word included in historical retrieve data may be determined, such that the table of association degrees between semantic fragments and main words in historical retrieve data. Therefore, when the semantic fragments in the semantic fragment set and the first main word are determined, the association degree between each semantic fragment and the first main word may be determined by searching the table of the association degrees.

In an embodiment of the present disclosure, in order to increase the rate of the data training on the historical retrieve data, before performing data training on the historical retrieve data, the historical retrieve data may be cleaned, that is, before block 102a, the method may include:

acquiring the historical retrieve data;

cleaning the historical retrieve data according to at least one of a retrieval frequency, a satisfaction degree or a click rate.

Correspondingly, performing data training on the historical retrieve data in block 102a may include: performing the data training on the cleaned historical retrieve data.

Specifically, threshold values of the retrieval frequency, the satisfaction degree and the click rate may be preset, respectively, such that after the historical retrieve data is acquired, retrieve data having the retrieval frequency, the satisfaction degree and the click rate all smaller than the corresponding threshold values may be abandoned, thereby cleaning the historical retrieve data. Moreover, the cleaned historical retrieve data is subjected to the data training, so as to determine the association degree between each semantic fragment and each main word included in the historical retrieve data.

At block 103, the semantic fragment set is filtered according to the association degree between each semantic fragment in the semantic fragment set and the first main word, and an object semantic fragment set corresponding to the query is determined.

It should be understood that, after the query is pre-processed, one semantic fragment may be overlapped with another semantic fragment included in the query, that is, a boundary of word segmentation may vary. For example, in the query "find a funny English movie without paying", semantic fragments such as "without paying", "paying", "funny English", "funny" and "English" may be included in the query. Therefore, in an embodiment of the present disclosure, the semantic fragment set needs to be filtered to determine the object semantic fragment set corresponding to the query.

Specifically, a threshold value of the association degree may be preset. In a determined semantic fragment set, if a certain semantic fragment may be segmented into several sub-semantic fragments, and an association degree between each sub-semantic fragment and the first main word is greater than the preset threshold value, the certain semantic fragment can be segmented and the sub-semantic fragments segmented from the certain semantic fragment are determined as object semantic fragments. However, if the association degree between a sub-semantic fragment and the first mian word is smaller than the preset threshold, the certain semantic fragment is determined as the object semantic fragment.

In should be understood that, in an embodiment of the present disclosure, "of", "in", "on", "at" and the like may be determined as stop words, thus saving memory and improving processing efficiency.

For example, in the query "find a funny English movie without paying", after the query is pre-processed, "movie" is determined to be the first main word, and the semantic fragments included in the semantic fragment set may be for example "find", "funny", "find a funny", "English", "funny English", "without paying" and "paying". The threshold value of the association degree is preset to be the retrieval frequency of 10000.

Specifically, the semantic fragment "without paying" may be segmented into "without" and "paying". According to the table of association degrees, it can be determined that a retrieval frequency of "without movie" is 10 and a retrieval frequency of "paying movie" is 15000. It can be seen that, the retrieval frequency of "without movie" is smaller than the preset threshold value, such that "paying" may be removed from the semantic fragment set, and "without paying" may be determined to be an object semantic fragment.

In addition, the semantic fragment "funny English" may be segmented into "funny" and "English". According to the table of association degrees, it can be determined that a retrieval frequency of "funny movie" is 13000 and a retrieval frequency of "English movie" is 14000. In other words, retrieval frequencies of sub-queries formed by "funny" and "movie" and by "English" and "movie" are both greater than the preset threshold value, such that "funny English" may be removed from the semantic fragment set, and "funny" and "English" may be determined to be object semantic fragments.

With the method for acquiring a semantic fragment of a query based on artificial intelligence according to embodiments of the present disclosure, the query is pre-processed and the first main word and the semantic fragment set included in the query are determined firstly, the association degree between each semantic fragment in the semantic fragment set and the first main word is determined according to historical retrieve data secondly; and the semantic fragment set is filtered according to the association degree to determine the object semantic fragment set corresponding to the query finally. Therefore, the object semantic fragment set corresponding to the query is acquired without the manually edited extraction template, which saves human resources and is conducive to automation. Moreover, the semantic fragment may be acquired in a flexible manner, such manner is self-adapt for mining semantic fragments with different segmentation sizes, which improves effect of semantic fragment recognition, and thus the requirements of the users may be better met by the retrieved result of the query and experience of the user may be improved.

It can be known from above analysis that the object semantic fragment set corresponding to the query may be determined according to the association degree between the first main word in the query and each semantic fragment in the semantic fragment set. In actual practice, the determined object semantic fragment set may also be filtered to improve accuracy of the semantic fragment set. Above conditions may be further described in detail with reference to FIG. 2.

Figure 2:
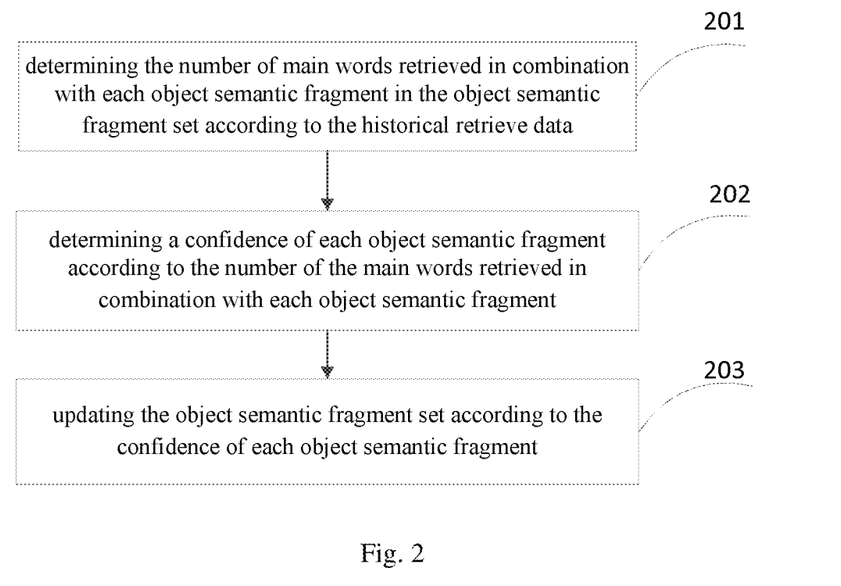
FIG. 2 is a flow chart of a method for acquiring a semantic fragment of a query based on artificial intelligence according to another embodiment of the present disclosure.

FIG. 2 is a flow chart of a method for acquiring a semantic fragment of a query based on artificial intelligence according to another embodiment of the present disclosure.

As shown in FIG. 2, the method may further include the following blocks.

At block 201, the number of main words retrieved in combination with each object semantic fragment in the object semantic fragment set is determined according to the historical retrieve data.

At block 202, a confidence of each object semantic fragment is determined according to the number of the main words retrieved in combination with each object semantic fragment.

Specifically, after the object semantic fragment set is determined, the number of the main words retrieved in combination with each object semantic fragment in the object semantic fragment set may be determined according to the historical retrieve data. If the number of the main words retrieved in combination with a certain object semantic fragment is small, that is, the certain object semantic fragment only can embellish a few of the main words, such that the certain object semantic fragment has a low confidence. If the number of the main words retrieved in combination with the certain object semantic fragment is large, that is, the certain object semantic fragment may embellish a large amount of the main words, such that the certain object semantic fragment has a high confidence.

At block 203, the object semantic fragment set is updated according to the confidence of each object semantic fragment.

Specifically, a threshold value may be preset for the confidence. If an object semantic fragment in the object semantic fragment set has a confidence lower than the threshold value, said object semantic fragment may be abandoned, thereby updating the object semantic fragment set.

It should be understood that, after the object semantic fragment set corresponding to the query is determined, retrieval may be performed according to the object semantic fragment set, and a retrieval result corresponding to each object semantic fragment in the object semantic fragment set may be acquired.

Correspondingly, in an embodiment of the present disclosure, a display mode of the retrieval results corresponding to the query may be determined according to the confidence of each object semantic fragment in the object semantic fragment set.

In other words, the followings may be performed after block 202:

acquiring a retrieval result according to each object semantic fragment;

determining a display order of the retrieval results according to the confidence of each object semantic fragment.

Specifically, after the retrieval results are acquired according to each object semantic fragment, retrieval results corresponding to object semantic fragment with higher confidences may be displayed preferentially, thereby better meeting requirements of users and improving experience of users.

With the method for acquiring a semantic fragment of a query based on artificial intelligence according to embodiments of the present disclosure, after the object semantic fragment set corresponding to the query is determined, the number of main words retrieved in combination with each object semantic fragment in the object semantic fragment set is determined firstly according to the historical retrieve data, the confidence of each object semantic fragment is determined secondly according to the number of the main words retrieved in combination with each object semantic fragment, and the object semantic fragment set is updated finally according to the confidence of each object semantic fragment. Therefore, the object semantic fragment set corresponding to the query is acquired without the manually edited extraction template and the object semantic fragment set is updated, which saves human resources and is conducive to automation. Moreover, the semantic fragment may be acquired in a flexible manner, such manner is self-adapt for mining semantic fragments with different segmentation sizes, which improves effect of semantic fragment recognition, and thus the requirements of the users may be better met by the retrieved result of the query and experience of the user may be improved.

Figure 3:
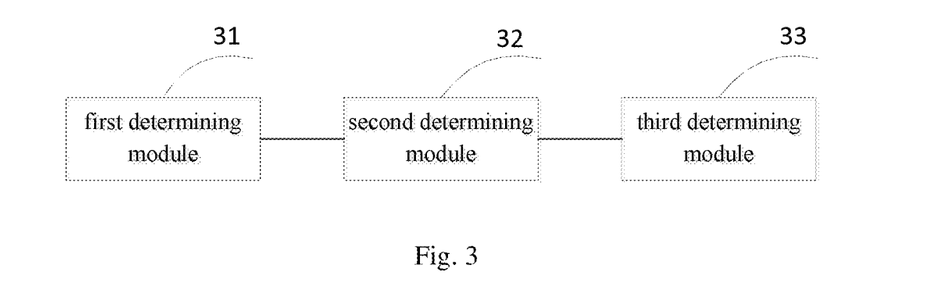
FIG. 3 is a schematic diagram showing an apparatus for acquiring a semantic fragment of a query based on artificial intelligence according to an embodiment of the present disclosure.

FIG. 3 is a schematic diagram showing an apparatus for acquiring a semantic fragment of a query based on artificial intelligence according to an embodiment of the present disclosure.

As shown in FIG. 3, the apparatus for acquiring a semantic fragment of a query based on artificial intelligence includes: one or more processors; a memory; one or more software modules stored in the memory and executable by the one or more processors, and including:

a first determining module 31 configured to pre-process the query and determine a first main word and a semantic fragment set included in the query;

a second determining module 32 configured to determine an association degree between each semantic fragment in the semantic fragment set and the first main word according to historical retrieve data;

a third determining module 33 configured to filter the semantic fragment set according to the association degree and determine an object semantic fragment set corresponding to the query.

Specifically, the apparatus for acquiring a semantic fragment of a query based on artificial intelligence provided in embodiments of the present disclosure may be configured in any terminal to perform the method for acquiring a semantic fragment of a query based on artificial intelligence described in above embodiments, so as to acquire the object semantic fragment set corresponding to the query.

In an implementation of an embodiment of the present disclosure, the first determining module 31 described above may include:

a first determining unit configured to perform a word segmentation on the query and determine a word segment set included in the query;

a second determining unit configured to determine the first main word in the word segment set according to a preset main word list.

In an embodiment of the present disclosure, the second determining module is specifically configured to:

determine whether a first word segment at the end of the query is in a preset noun list or a preset proper noun entity word list;

if yes, determine the first word segment is the first main word;

if no, determine whether a second word segment at the start of the query is in the preset noun list or the preset proper noun entity word list, determine that the second word segment is the first main word if the second word segment is in the preset noun list or the preset proper noun entity word list.

In another implementation of an embodiment of the present disclosure, the second determining module 32 includes:

a third determining unit configured to perform data training on the historical retrieve data and determine a table of association degrees between semantic fragments and main words in the historical retrieve data;

a fourth determining unit configured to determine the association degree between each semantic fragment in the semantic fragment set and the first main word by searching the table of the association degrees.

In another implementation of an embodiment of the present disclosure, the second determining module 32 further includes:

an acquiring unit configured to acquire the historical retrieve data;

a processing unit configured to clean the historical retrieve data according to at least one of a retrieval frequency, a satisfaction degree or a click rate, in which the third determining unit is specifically configured to:

perform the data training on the cleaned historical retrieve data.

It should be understood that explanation and illustration of the method for acquiring a semantic fragment of a query based on artificial intelligence in above embodiments are suitable for the apparatus for acquiring a semantic fragment of a query based on artificial intelligence in this embodiment, and thus no more details are described here.

With the apparatus for acquiring a semantic fragment of a query based on artificial intelligence according to embodiments of the present disclosure, the query is pre-processed and the first main word and the semantic fragment set included in the query are determined firstly, the association degree between each semantic fragment in the semantic fragment set and the first main word is determined according to historical retrieve data secondly; and the semantic fragment set is filtered according to the association degree to determine the object semantic fragment set corresponding to the query finally. Therefore, the object semantic fragment set corresponding to the query is acquired without the manually edited extraction template, which saves human resources and is conducive to automation. Moreover, the semantic fragment may be acquired in a flexible manner, such manner is self-adapt for mining semantic fragments with different segmentation sizes, which improves effect of semantic fragment recognition, and thus the requirements of the users may be better met by the retrieved result of the query and experience of the user may be improved.

Figure 4:
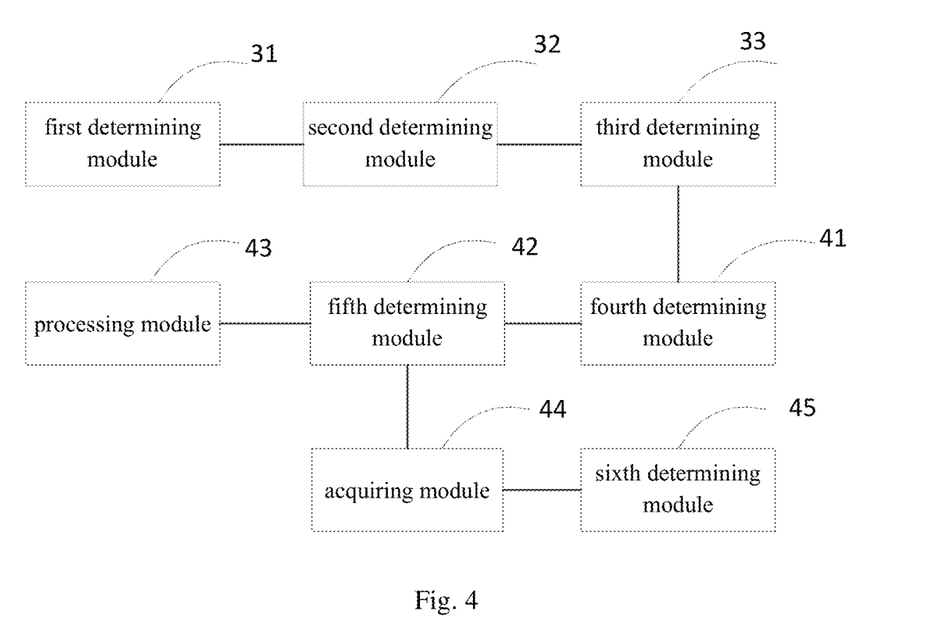
FIG. 4 is a schematic diagram showing an apparatus for acquiring a semantic fragment of a query based on artificial intelligence according to another embodiment of the present disclosure.

FIG. 4 is a schematic diagram showing an apparatus for acquiring a semantic fragment of a query based on artificial intelligence according to another embodiment of the present disclosure.

As shown in FIG. 4, on the basis of FIG. 3, the apparatus for acquiring a semantic fragment of a query based on artificial intelligence may further include:

a fourth determining module 41 configured to determine the number of main words retrieved in combination with each object semantic fragment in the object semantic fragment set according to the historical retrieve data;

a fifth determining module 42 configured to determine a confidence of each object semantic fragment according to the number of the main words retrieved in combination with each object semantic fragment;

a processing module 43 configured to update the object semantic fragment set according to the confidence of each object semantic fragment;

an acquiring module 44 configured to acquire a retrieval result according to each object semantic fragment;

a sixth determining module 45 configured to determine a display order of the retrieval results according to the confidence of each object semantic fragment.

It should be understood that explanation and illustration of the method for acquiring a semantic fragment of a query based on artificial intelligence in above embodiments are suitable for the apparatus for acquiring a semantic fragment of a query based on artificial intelligence in this embodiment, and thus no more details are described here.

With the apparatus for acquiring a semantic fragment of a query based on artificial intelligence according to embodiments of the present disclosure, the query is pre-processed and the first main word and the semantic fragment set included in the query are determined firstly, the association degree between each semantic fragment in the semantic fragment set and the first main word is determined according to historical retrieve data secondly; and the semantic fragment set is filtered according to the association degree to determine the object semantic fragment set corresponding to the query finally. Therefore, the object semantic fragment set corresponding to the query is acquired without the manually edited extraction template, which saves human resources and is conducive to automation. Moreover, the semantic fragment may be acquired in a flexible manner, such manner is self-adapt for mining semantic fragments with different segmentation sizes, which improves effect of semantic fragment recognition, and thus the requirements of the users may be better met by the retrieved result of the query and experience of the user may be improved.

In embodiments of a third aspect of the present disclosure, a computer-readable storage medium is provided, having stored therein computer programs that, when executed by a processor of a mobile terminal, causes the mobile terminal to perform the method for acquiring a semantic fragment of a query based on artificial intelligence described in above embodiments.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for acquiring a semantic fragment of a query based on artificial intelligence, comprising:
   pre-processing the query and determining a first main word and a semantic fragment set included in the query;
   determining an association degree between each semantic fragment in the semantic fragment set and the first main word according to historical retrieve data;
   filtering the semantic fragment set according to the association degree and determining an object semantic fragment set corresponding to the query;
   determining the number of main words retrieved in combination with each object semantic fragment in the object semantic fragment set according to the historical retrieve data;

determining a confidence of each object semantic fragment according to the number of the main words retrieved in combination with each object semantic fragment; and
updating the object semantic fragment set according to the confidence of each object semantic fragment.

2. The method according to claim 1, wherein determining a first main word and a semantic fragment set included in the query comprises:
performing a word segmentation on the query and determining a word segment set included in the query;
determining the first main word in the word segment set according to a preset main word list.

3. The method according to claim 2, wherein determining the first main word in the word segment set comprises:
determining whether a first word segment at the end of the query is in one of a preset noun list or a preset proper noun entity word list;
if yes, determining the first word segment is the first main word;
if no, determining whether a second word segment at the start of the query is in the preset noun list or the preset proper noun entity word list,
determining that the second word segment is the first main word if the second word segment is in the preset noun list or the preset proper noun entity word list.

4. The method according to claim 1, wherein determining an association degree between each semantic fragment in the semantic fragment set and the first main word according to historical retrieve data comprises:
performing data training on the historical retrieve data, and determining a table of association degrees between semantic fragments and main words in the historical retrieve data;
determining the association degree between each semantic fragment in the semantic fragment set and the first main word by searching the table of the association degrees.

5. The method according to claim 4, wherein before performing data training on the historical retrieve data, the method further comprises:
acquiring the historical retrieve data;
cleaning the historical retrieve data according to at least one of a retrieval frequency, a satisfaction degree or a click rate,
in which performing data training on the historical retrieve data comprises:
performing the data training on the cleaned historical retrieve data.

6. The method according to claim 1, wherein after determining a confidence of each object semantic fragment, the method further comprises:
acquiring a retrieval result according to each object semantic fragment;
determining a display order of the retrieval results according to the confidence of each object semantic fragment.

7. An apparatus for acquiring a semantic fragment of a query based on artificial intelligence, comprising:
one or more processors;
a memory;
one or more software modules stored in the memory and executable by the one or more processors, and comprising:
a first determining module configured to pre-process the query and determine a first main word and a semantic fragment set included in the query;
a second determining module configured to determine an association degree between each semantic fragment in the semantic fragment set and the first main word according to historical retrieve data;
a third determining module configured to filter the semantic fragment set according to the association degree and determine an object semantic fragment set corresponding to the query;
a fourth determining module configured to determine the number of main words retrieved in combination with each object semantic fragment in the object semantic fragment set according to the historical retrieve data;
a fifth determining module configured to determine a confidence of each object semantic fragment according to the number of the main words retrieved in combination with each object semantic fragment; and
a processing module configured to update the object semantic fragment set according to the confidence of each object semantic fragment.

8. The apparatus according to claim 7, wherein the first determining module comprises:
a first determining unit configured to perform a word segmentation on the query and determine a word segment set included in the query;
a second determining unit configured to determine the first main word in the word segment set according to a preset main word list.

9. The apparatus according to claim 8, wherein the second determining module is specifically configured to:
determine whether a first word segment at the end of the query is in one of a preset noun list or a preset proper noun entity word list;
if yes, determine the first word segment is the first main word;
if no, determine whether a second word segment at the start of the query is in the preset noun list or the preset proper noun entity word list,
determine that the second word segment is the first main word if the second word segment is in the preset noun list or the preset proper noun entity word list.

10. The apparatus according to claim 7, wherein the second determining module comprises:
a third determining unit configured to perform data training on the historical retrieve data and determine a table of association degrees between semantic fragments and main words in the historical retrieve data;
a fourth determining unit configured to determine the association degree between each semantic fragment in the semantic fragment set and the first main word by searching the table of the association degrees.

11. The apparatus according to claim 10, wherein the second determining module further comprises:
an acquiring unit configured to acquire the historical retrieve data;
a processing unit configured to clean the historical retrieve data according to at least one of a retrieval frequency, a satisfaction degree or a click rate,
in which the third determining unit is specifically configured to:
perform the data training on the cleaned historical retrieve data.

12. The apparatus according to claim 7, further comprising:
an acquiring module configured to acquire a retrieval result according to each object semantic fragment;

a sixth determining module configured to determine a display order of the retrieval results according to the confidence of each object semantic fragment.

13. A non-transitory computer-readable storage medium having stored therein computer programs that, when executed by a processor of a mobile terminal, causes the mobile terminal to perform a method for acquiring a semantic fragment of a query based on artificial intelligence, the method comprising:

pre-processing the query and determining a first main word and a semantic fragment set included in the query;

determining an association degree between each semantic fragment in the semantic fragment set and the first main word according to historical retrieve data;

filtering the semantic fragment set according to the association degree and determining an object semantic fragment set corresponding to the query;

determining the number of main words retrieved in combination with each object semantic fragment in the object semantic fragment set according to the historical retrieve data;

determining a confidence of each object semantic fragment according to the number of the main words retrieved in combination with each semantic fragment; and updating the object semantic fragment set according to the confidence of each object semantic fragment.

14. The storage medium according to claim 13, wherein determining a first main word and a semantic fragment set included in the query comprises:

performing a word segmentation on the query and determining a word segment set included in the query;

determining the first main word in the word segment set according to a preset main word list.

15. The storage medium according to claim 14, wherein determining the first main word in the word segment set comprises:

determining whether a first word segment included in the end of the query is in one of a preset noun list or a preset proper noun entity word list;

if yes, determining the first word segment is the first main word;

if no, determining whether a second word segment included in the start of the query is in the preset noun list or the preset proper noun entity word list, determining that the second word segment is the first main word if the second word segment is in the preset noun list or the preset proper noun entity word list.

16. The storage medium according to claim 13, wherein determining an association degree between each semantic fragment in the semantic fragment set and the first main word according to historical retrieve data comprises:

performing data training on the historical retrieve data, and determining a table of the association degrees between semantic fragments in the historical retrieve data and main words;

determining the association degree between each semantic fragment in the semantic fragment set and the first main word by searching the table of the association degrees.

17. The storage medium according to claim 16, wherein before performing data training on the historical retrieve data, the method further comprises:

acquiring the historical retrieve data;

cleaning the historical retrieve data according to at least one of a retrieval frequency, a satisfaction degree and a click rate, in which performing data training on the historical retrieve data comprises:

performing the data training on the cleaned historical retrieve data.

* * * * *